Patented Mar. 1, 1932                                                            1,847,095

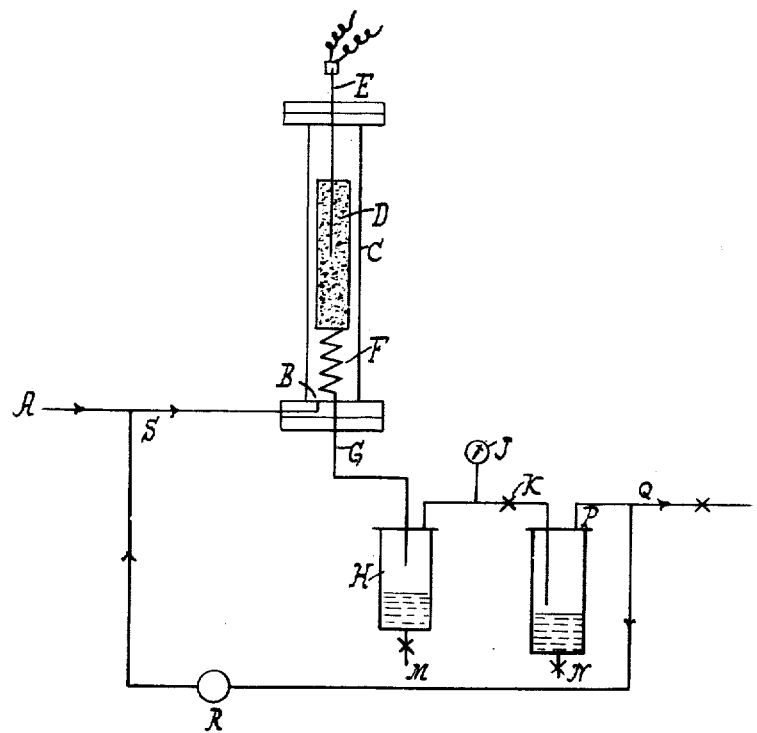

UNITED STATES PATENT OFFICE

ALWIN MITTASCH, OF MANNHEIM, RUDOLF WIETZEL, OF LUDWIGSHAFEN-ON-THE-RHINE, AND CONRAD PFAUNDLER, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PREVENTION OF THE FORMATION OF CARBON IN OPERATIONS CARRIED OUT WITH HYDROCARBONS AT AN ELEVATED TEMPERATURE

Original application filed March 11, 1927, Serial No. 174,694, and in Germany March 13, 1926. Divided and this application filed August 2, 1928. Serial No. 297,096.

This is a divisional application relating to subject-matter which has been divided out from our copending application Serial No. 174,694, filed March 11, 1927.

This invention relates to improvements in the prevention of the undesirable formation of carbon and soot in operations conducted with gaseous or liquid hydrocarbons or mixtures containing the same at an elevated temperature. As examples of such operations conducted with hydrocarbons at an elevated temperature may be mentioned a conversion of high boiling hydrocarbons into others of low boiling point, the transformation of gaseous hydrocarbons into liquid hydrocarbons, the distillation of hydrocarbons, the dehydrogenation of aromatic compounds, the treatment of coaly materials by extraction with solvents with or without the aid of pressure, the hydrogenation of unsaturated compounds, for example of ethylene to ethane, and operations in which hydrocarbons or mixtures containing the same are formed for example by splitting off water from, or hydrogenating organic compounds which contain oxygen, such as phenols, extraction products of coaly materials and the like. All such operations are hereinafter referred to for the sake of brevity as operations carried out with hydrocarbons at an elevated temperature.

We have now found that the formation of coke and soot in these said operations may be very considerably diminished or entirely prevented by adding or supplying metalloids to the metallic (and non-metallic, if any) materials which come into contact with the liquid or gaseous hydrocarbons at high temperatures, mere traces of such additions being often sufficient. Boron, or its compounds, are particularly suitable for this purpose, arsenic, antimony, bismuth, phosphorus, selenium or the compounds thereof and silicon being also applicable. All these materials are capable of furnishing volatile hydrogen compounds. Thus the hydrides of boron, arsenic, antimony, bismuth, phosphorus, selenium and silicon are of high utility in this process. Such additions may be effected in a variety of ways, where employing, for example, materials, such as iron, copper and the like alloyed with boron or the like. For the construction of the apparatus it is generally sufficient, however, to coat the materials with a thin layer of substances to be added by wetting them with solutions of boric acid or treating them with gases and the like containing boron or arsenic or the like. The addition of the said metalloids may also be effected by adding to the hydrocarbons to be treated small quantities of the hydrogen compounds thereof. In some cases it may also be of advantage to mix any non-metallic substances present in the apparatus, especially insulating masses of magnesium oxid or the like, and catalysts, with boric acid and the like, or to use for the construction of such parts substances containing metalloids as for example boron nitride, diamotaceous earth, mica and the like. The advantages of this method of working are particularly apparent in operating with liquid hydrocarbons under pressure. The said method may also be applied, for example, in the distillation of hydrocarbon mixtures, followed by catalytic treatment of the vapors in the presence or absence of reactive gases.

Substances (free iron in particular) leading to deposition of soot should be absolutely excluded from the hot parts of the of the apparatus. It should however be noted that iron in the form of alloys such as steels containing chromium, manganese, or tungsten, and the like does not exhibit any injurious action.

According to the present invention, the substances coming into consideration as materials for the inner walls of the reaction vessels, for feed and effluent pipes, heat exchanging devices (if any), and the like, are more particularly the noble metals, quartz, ferro-silicon, mica, glazed or fused porcelain, aluminium, molybdenum, tantalum, chromium, and alloys of chromium free from iron, manganese, molybdenum, cobalt and the like, with or without a coating of lustrous carbon and also other materials coated with lustrous carbon, such as coal, or the like. The use of catalysts for example in the transformation of gaseous hydrocarbons into liquid hydrocarbons, is not essential, but if they are used, it has been found that all such substances are suitable as do not lead to the production of any appreciable deposition of coke or soot (if at all) namely the materials mentioned above, or silica, pumice, barium carbonate, charcoal impregnated with barium salts, boron, tungsten and the like either alone or on suitable carriers or the like, or in conjunction with other compounds.

In working with carbon monoxid or mixtures containing the same, and also in the conversion of hydrocarbons of high boiling point into others of lower boiling point, the said method of operating with additions of metalloids or metalloid compounds is also a matter of considerable practical importance.

The manner of carrying the process according to the present invention into practice will be further illustrated with reference to the accompanying drawing, but it should be understood that the invention is not limited to the modification shown in the drawing.

A hydrocarbon gas to be polymerized is introduced by way of a pipe A into the pressure vessel C at B. About 0.01 per cent by weight of a hydride of one of the said metalloids is admixed with the said hydrocarbon gas at A. D represents the catalyst. F is a heat regenerator through which the liquid hydrocarbons formed and in which they give off their heat to the hydrocarbon gases entering at B. The catalyst is heated by means of the device E. The reaction products are passed from G into the separating vessel H. Liquid hydrocarbon products are drawn off at M. The gases pass off at O and through the valve K into the separating vessel L from which a further amount of liquid hydrocarbons is drawn off at N. The gases pass off at P and may either be withdrawn from the system at Q or may be recycled by way of the circulating pump R.

The following example will further illustrate how the said invention may be carried into practical effect but the invention is not limited thereto.

Example: A mixture of 80 percent of ethylene, 17 percent of hydrogen and 3 percent of carbon dioxide to which from 0.01 to 0.05 percent of hydrides of silicon have been added, is passed, while under a pressure of 40 atmospheres, through a chromium-nickel tube lined with tin which contains pieces, of the size of peas, of silica gel coated with lustrous carbon by a treatment with vapors of benzene at 850° C., and which is heated to a temperature between 550° and 650° C. By condensing the vapors issuing from the tube a mixture of low-boiling unsaturated and aromatic hydrocarbons is obtained which may satisfactorily be employed as motor fuel. If no hydrides of silicon are added to the initial gas mixture the tube is soon clogged by deposition of carbon.

What we claim is:—

1. A process for the prevention of an undesirable formation of carbon and soot in operations carried out with hydrocarbons at an elevated temperature, which comprises supplying other than as a catalyst or a source of hydrogen a hydride of a metalloid selected from the group consisting of boron, arsenic, antimony, bismuth, phosphorus, selenium and silicon to the metallic materials which come into contact with the hydrocarbons so long as they have a high temperature to thereby prevent said undesirable formation of carbon and soot.

2. A process for the prevention of an undesirable formation of carbon and soot on the metallic surfaces and non-metallic surfaces of the apparatus in operations carried out with hydrocarbons at elevated temperatures, which comprises admixing other than as a catalyst or a source of hydrogen a small amount of a hydride of a metalloid selected from the group consisting of boron, arsenic, antimony, bismuth, phosphorus, selenium and silicon with said hydrocarbons to thereby prevent said undesirable formation of carbon and soot.

3. In the conversion of gaseous hydrocarbons into liquid hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of arsenic, bismuth, phosphorus, selenium and silicon with said hydrocarbons to thereby prevent said undesirable formation of carbon and soot.

4. In the distillation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of arsenic, bismuth, phosphorus, selenium and silicon with said hydrocarbons to thereby prevent said undesirable formation of carbon and soot.

5. In the dehydrogenation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of arsenic, bismuth, phosphorus selenium and silicon with said hydrocarbons to thereby present said undesirable formation of carbon and soot.

6. In the conversion of gaseous hydrocarbons into liquid hydrocarbons, presenting a formation of carbon and soot on the surfaces of the apparatus with which the hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

7. In the distillation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

8. In the dehydrogenation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

In testimony whereof, we affix our signatures.

ALWIN MITTASCH.
RUDOLF WIETZEL.
CONRAD PFAUNDLER.

of the apparatus with which the hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

7. In the distillation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

8. In the dehydrogenation of hydrocarbons, preventing a formation of carbon and soot on the surfaces of the apparatus with which said hydrocarbons come into contact by admixing other than as a catalyst or a source of hydrogen a small amount of a hydride of a metalloid selected from the group consisting of boron and antimony with said hydrocarbons to thereby prevent said undesirable formation of carbon and soot.

In testimony whereof, we affix our signatures.

ALWIN MITTASCH.
RUDOLF WIETZEL.
CONRAD PFAUNDLER.

CERTIFICATE OF CORRECTION.

Patent No. 1,847,095.     March 1, 1932.

ALWIN MITTASCH ET AL.

It is hereby certified that error appears in the printed specification of the above numbered patent requiring correction as follows: Page 2, line 126, claim 5, for "present" read "prevent"; and line 129, claim 6, for "presenting" read "preventing"; and that the said Letters Patent should be read with these corrections therein that the same may conform to the record of the case in the Patent Office.

Signed and sealed this 13th day of December, A. D. 1932.

M. J. Moore,
Acting Commissioner of Patents.

(Seal)

CERTIFICATE OF CORRECTION.

Patent No. 1,847,095.                                                           March 1, 1932.

ALWIN MITTASCH ET AL.

It is hereby certified that error appears in the printed specification of the above numbered patent requiring correction as follows: Page 2, line 126, claim 5, for "present" read "prevent"; and line 129, claim 6, for "presenting" read "preventing"; and that the said Letters Patent should be read with these corrections therein that the same may conform to the record of the case in the Patent Office.

Signed and sealed this 13th day of December, A. D. 1932.

(Seal)                                                     M. J. Moore,
                                                            Acting Commissioner of Patents.